US007152615B1

(12) United States Patent
Engdahl

(10) Patent No.: US 7,152,615 B1
(45) Date of Patent: Dec. 26, 2006

(54) EARTHQUAKE ACTUATED HORIZONTAL VALVE WITH MICRO SWITCH

(76) Inventor: Paul D. Engdahl, 2930 Grace Ln. #E, Costa Mesa, CA (US) 92626

( * ) Notice: Subject to any disclaimer, the term of this patent is extended or adjusted under 35 U.S.C. 154(b) by 294 days.

(21) Appl. No.: 10/930,036

(22) Filed: Aug. 31, 2004

Related U.S. Application Data

(63) Continuation-in-part of application No. 10/844,884, filed on May 14, 2004, now Pat. No. 6,917,004.

(51) Int. Cl.
*F16K 17/36* (2006.01)

(52) U.S. Cl. .............................. 137/1; 137/39; 137/45; 137/46; 137/554; 251/232

(58) Field of Classification Search .................. 137/39, 137/45, 46, 1, 554; 251/232
See application file for complete search history.

(56) References Cited

U.S. PATENT DOCUMENTS 4,131,124 A * 12/1978 Sunde ......................... 137/45
4,185,507 A 1/1980 Domyan .......................... 74/2
4,261,379 A 4/1981 Berry .......................... 137/39
4,625,758 A * 12/1986 Murray ........................ 137/554
4,782,333 A * 11/1988 Merchant .................... 340/610
5,078,172 A * 1/1992 Gonzalez ..................... 137/38
5,209,454 A 5/1993 Engdahl et al. ............... 251/65
5,307,699 A 5/1994 Engdahl et al. .................. 74/2
6,112,764 A 9/2000 Engdahl et al. ............. 137/554
6,343,615 B1 * 2/2002 Miller et al. ................ 137/202

* cited by examiner

*Primary Examiner*—Stephen M. Hepperle
(74) *Attorney, Agent, or Firm*—Kenneth L. Green; Edgar W. Averill, Jr.

(57) ABSTRACT

An earthquake actuated device includes a flapper-valve adapted to block a gas flow and a micro switch for closing or opening a circuit. A seismic sensor responds to accelerations characteristic of an earthquake. The sensor cooperates with a magnet in a flapper arm to hold the flapper-valve open. When the sensor experiences sufficient motion, the flapper arm is released and the flapper-valve falls onto a seat, thereby closing and blocking the gas flow. The closing of the flapper-valve is further coupled into an actuation of the micro switch, thereby opening or closing the circuit.

15 Claims, 6 Drawing Sheets

3/6

EARTHQUAKE ACTUATED HORIZONTAL VALVE WITH MICRO SWITCH

BACKGROUND OF THE INVENTION

The present application is a Continuation In Part of U.S. application Ser. No. 10/844,884 filed May 14, 2004.

BACKGROUND OF THE INVENTION

The present invention relates to earthquake safety devices, and more particularly to devices which close a valve and actuate a micro switch as a result of an earthquake.

There is world wide concern regarding the effects of earthquakes. In recent years, earthquakes occurring around the world resulted in tens of thousands of deaths. Although modern building codes drastically reduce the human harm resulting from earthquakes, there is still a significant likelihood that deaths will occur even in modern countries. Although building codes have been successful in reducing the catastrophic collapse of structures, there is often substantial secondary damage resulting from gas fires, broken electrical wiring, and the like. Various devices have been developed to turn off gas lines and the like, either directly through a mechanical action, or indirectly through actuation of an electrical switch.

One such device is described in U.S. Pat. No. 4,185,507 for "Acceleration Responsive Tripping Mechanism," which describes a ball sitting on a pedestal. When motion occurs, the ball falls off the pedestal into a surrounding chamber (or dish), causing the chamber to lower against a spring, and to trip a micro switch. Disadvantageously, the device of the '507 patent includes a number of moving parts including a spring, vertically moving piston, and levers. Devices such as this are generally mounted, and forgotten. There is typically little to no inspection or maintenance, and as a result, such complexity is an invitation to failure.

U.S. Pat. No. 4,261,379 for "Vibration/Temperature Sensitive Valve Operating Apparatus," describes a ball siting in a cup. Motion causes the ball to fall out of the cup, and the cup raises slightly, this motion releases a trigger which results in the desired actuation. Unfortunately the '379 patent also includes substantial mechanical complexity, including several arms, springs, and pins. Such mechanical complexity is undesirable for the reasons cited above.

A simple device for directly turning off a gas flow is described by U.S. Pat. No. 5,209,454 for "Automatic Safety Shutoff Valve," which is assigned the inventor of the present invention. The '454 patent describes several embodiments of a flapper-type gas valve which closes when experiencing the accelerations characteristic of an earthquake. While the valve of the '454 patent provides the desired gas shut-off functionality, in some applications there is an additional need for a valve which both shuts off a gas flow, and provides an electrical signal for an alarm or monitor.

BRIEF SUMMARY OF THE INVENTION

The present invention addresses the above and other needs by providing an earthquake actuated device includes a flapper-valve adapted to block a gas flow and a micro switch for closing or opening a circuit. A seismic sensor responds to accelerations characteristic of an earthquake. The sensor cooperates with a magnet in a flapper arm to hold the flapper-valve open. When the sensor experiences sufficient motion, the flapper arm is released and the flapper-valve falls onto a seat, thereby closing and blocking the gas flow. The closing of the flapper-valve is further coupled into an actuation of the micro switch, thereby opening or closing the circuit.

In accordance with one aspect of the invention, there is provided an earthquake actuated valve and switch. The valve and switch include a valve housing having a gas inlet and a gas outlet, a seismic sensor having a rest position and a disturbed position, a flapper-valve having an open position and a closed position, and an electrical switch mechanically actuated by the flapper-valve. The flapper-valve is adapted to be held in the open position when the seismic sensor is in the rest position, and the flapper-valve is adapted to fall into the closed position when the seismic sensor moves from the rest position to the disturbed position. The electrical switch is actuated when the flapper-valve moves between the open position and the closed position.

In accordance with another aspect of the present invention a method is provided for closing a gas valve and actuating a switch in the event of an earthquake. The method comprises steps of aligning a seismic sensor to hold a flapper-valve in an open position, coupling a valve housing containing the seismic sensor to a structure that experiences accelerations during an earthquake, disturbing the seismic sensor when an earthquake occurs, allowing the flapper-valve to fall against a seat to block a flow of gas when the seismic switch is disturbed, coupling the fall of the flapper-valve to a switch actuator of an electrical switch, and actuating the switch. The method may further include turning a set lever to close the flapper-valve and actuate the switch, and turning a reset mechanism to open the flapper-valve and de-actuate the switch.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1B:
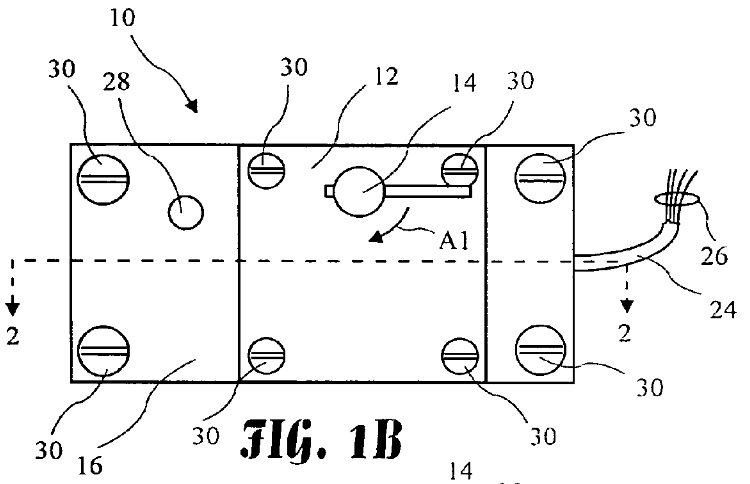
FIG. 1B is a top view of the valve and switch.
Figure 1A:
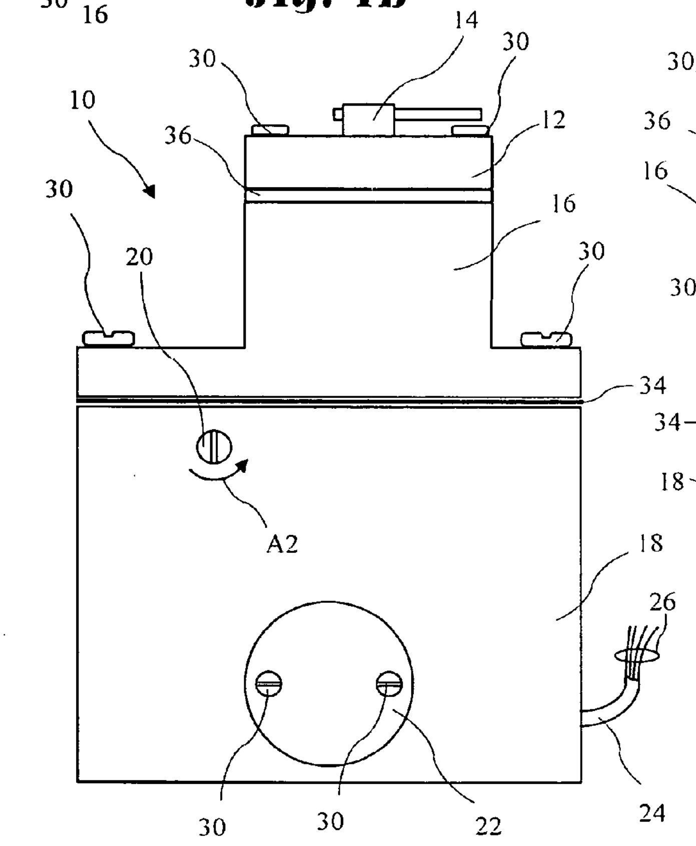
FIG. 1A is a side view of a valve and switch according to the present invention.
Figure 1C:
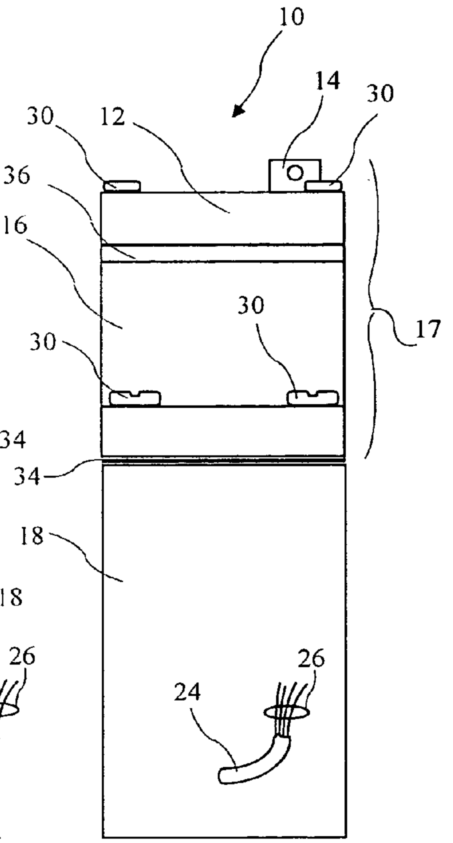
FIG. 1C is an end view of the valve and switch.

An earthquake actuated valve and switch 10 according to the present invention is shown in side view in FIG. 1A, in top view in FIG. 1B, and in end view in FIG. 1C. The valve and switch 10 includes both a gas flow control and electrical switching. The gas flow control structure is similar to the structure described in U.S. Pat. No. 6,112,764 for Automatic Safety Shutoff Valve," issued to the inventor of the present invention, and in particular as described in FIG. 1 as modified by FIG. 5 of the '764 patent. In the event of an earthquake, a seismic sensor (see FIG. 2A) triggers closing the flapper-valve. Such a seismic sensor is described in U.S. Pat. No. 5,307,699 for "Seismic Initiator for Earthquake Shutoff Valves and the Like," also issued to the inventor of the present invention. The '764 and '699 patents are hereby incorporated by reference.

The valve and switch 10 includes a control portion 17 including a set mechanism housing 12, a set lever 14 turnable about arc A1, a sensor housing cap 36, a window 28, and a sensor housing 16. First o-ring 37*a* forms a seal between the sensor housing cap 36 and the sensor housing 16. A valve housing 18 resides below the control portion 17 and includes a reset control 20 turnable about arc A2, a switch access 22 for providing access to an internal electrical switch, and a cable 24 carrying conductors 26. A gasket 34 (or alternatively, a sealer) resides between the sensor housing 16 and the valve housing 18. The window 28 allows viewing into the valve housing 18 to ascertain the state (i.e., open or closed) of the valve and switch 10. The various parts of the valve and switch 10 are attached by screws 30 of various sizes. The screws 30 may be slot screws, phillips screws, allen head screws, torx® screws, anti-tamper screws, or any screw type suitable to attaching the various parts. The screws 30 are preferably machine screws.

Figure 2B:
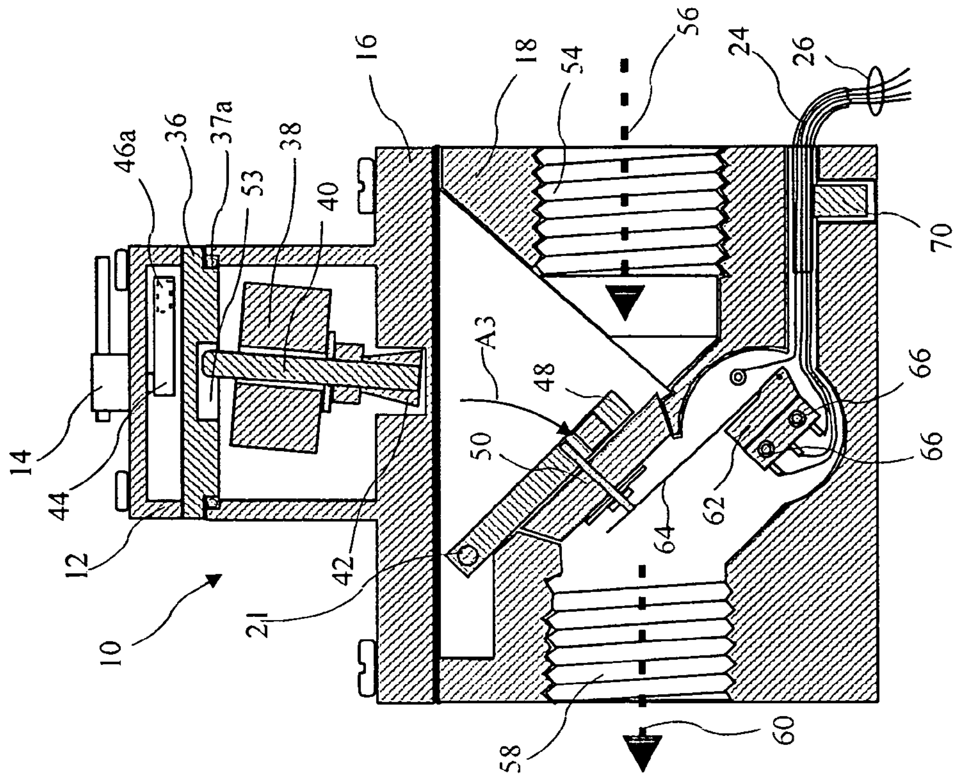
FIG. 2B is a second cross-section view of the interior of the valve and switch taken along line 2—2 of FIG. 1A, with the flapper-valve closed due to seismic accelerations.
Figure 2A:
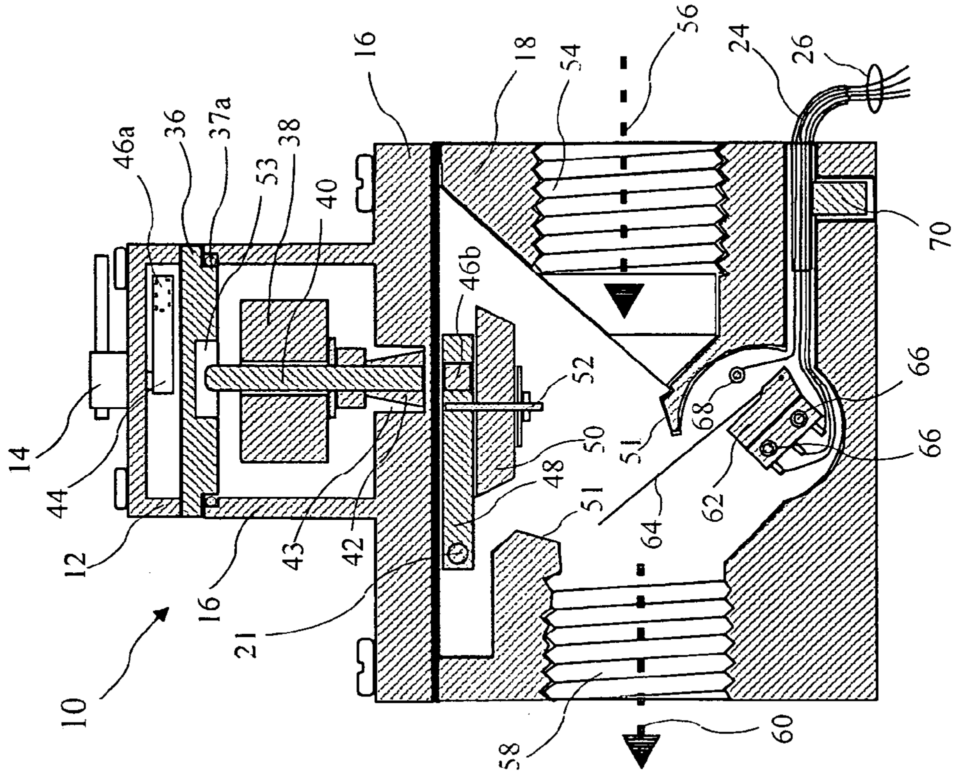
FIG. 2A is a cross-section view of the interior of the valve and switch taken along line 2—2 of FIG. 1A with a flapper-valve open.

A cross-sectional view of the valve and switch 10 taken along line 2—2 of FIG. 1B is shown in FIG. 2A. The set lever 14 connects to a magnet carrier 44 residing inside the set mechanism housing 12. A first magnet 46*a* resides in the magnet carrier 44. A seismic sensor comprises a shaft 40 loosely carrying a mass 38, and a conical base 42 resides inside the sensor housing 16. An upper end of the shaft 40 resides in a shaft cavity 53, wherein the shaft 40 may lean but still be constrained to a maximum lean. The function and structure of the seismic sensor is described in U.S. Pat. No. 5,307,699 for "Seismic Initiator for Earthquake Shutoff Valves and the Like." The seismic sensor normally rests squarely in a base cavity 43 (i.e., a flat lower surface of the conical base 42 rests parallel and on the floor of the base cavity 43). The structure and function of the set lever 14, magnet carrier 44, and magnet 46*a* are described in U.S. Pat. No. 6,112,764 for Automatic Safety Shutoff Valve," in FIGS. 5, 6, and 7. The '699 and 764 patents are incorporated by reference above.

A flapper arm 48, and a flapper-valve 50 attached to the flapper arm 48, pivot about a valve pivot 21. The flapper arm 48 and flapper-valve 50 are depicted in an open position in FIG. 2A wherein the flapper arm 48 and flapper-valve 50 are approximately horizontal. A second magnet 46*b* resides in the flapper arm 48 adjacent to the seismic sensor shaft 40, wherein magnetic attraction between the magnet 46*b* and the shaft 40 hold the flapper arm 48 and flapper-valve 50 in the open position allowing an inlet flow 56 to enter the inlet 54, pass though the valve housing 18, and exit as an outlet flow 60 through the outlet 58. The inlet 54 and the outlet 58 are approximately horizontal and are aligned to receive substantially horizontally running lines or pipes. The inlet 54 is preferably horizontally displaced from the outlet 58 thereby allowing easy connection into a horizontally running line.

A switch 62 resides in the valve housing 18 and includes a switch actuator 64 for actuating the switch 62. The switch 62 is held in place by fasteners 66 which preferably comprise screws, and more preferably comprise #2 screws and lock washers. Three of the conductors 26 connect to a normally open post, a normally closed post, and a neutral post on the switch 62. A fourth conductor 26 is grounded to the valve housing 18, preferably by a #2 screw and lock washer. The switch 62 is preferably a micro switch, more preferably a Single-Pole Double-Throw (SPDT) micro switch, and most preferably a type 15X, style 4, 311 5X 3-T micro switch manufactured by Honeywell in Morristown, N.J. The cable 24 is held in place in the valve housing 18 by a set screw 70 which is preferably a ¼ inch-20 by ¼ inch hex socket set screw having a cup point. The cable 24 and set screw are sealed to prevent gas leaks, preferably using DOW CORNING RTV 734 adhesive sealant.

A second cross-sectional view of the valve and switch 10 taken along line 2—2 of FIG. 1B is shown in FIG. 2B. The seismic sensor is shown in a disturbed position and no longer resides squarely in the rest position in the base cavity 43 (see FIG. 2A). The magnet 46*b* is somewhat separated from the shaft 40, thus reducing the magnetic attraction between the seismic sensor and the magnet 46*b* and thereby releasing the flapper arm 48 and attached flapper-valve 50. The flapper arm 48 and flapper-valve 50 are shown having pivoted along arc A3 around the valve pivot 21 into a closed (or fallen) position against the seat 51 (see FIG. 2A). The pin 52 (see FIG. 2A) is pressed against the switch actuator 64 thereby actuating the switch 62.

Figure 2D:
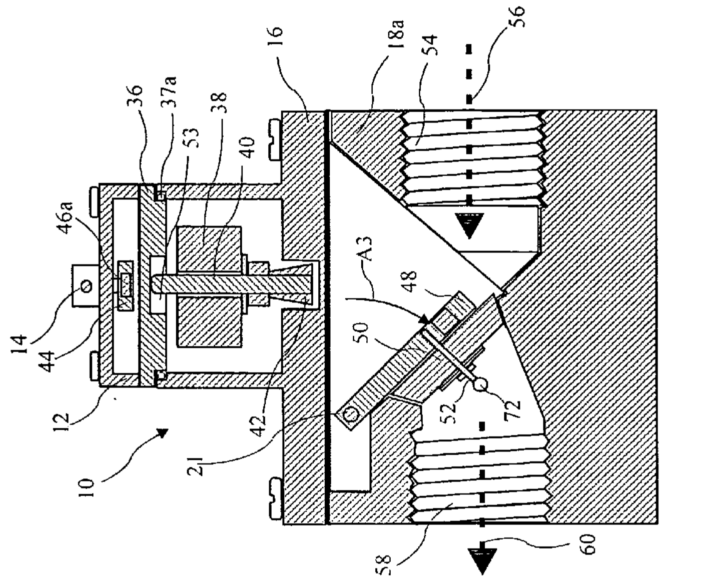
FIG. 2D is a fourth cross-section view of the interior of the valve and switch taken along line 2—2 of FIG. 1A, showing a switch arm mechanically cooperating with the flapper-valve.
Figure 2C:
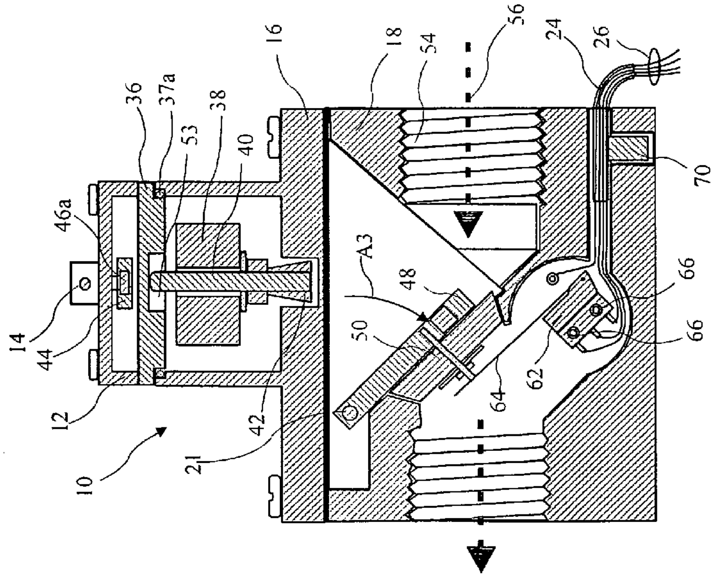
FIG. 2C is a third cross-section view of the interior of the valve and switch taken along line 2—2 of FIG. 1A, with the flapper-valve closed due to use of a set lever.

A third cross-sectional view of the valve and switch 10 taken along line 2—2 of FIG. 1B is shown in FIG. 2C. The set lever 14, magnet carrier 44, and magnet 46*a* have been turned along arc A1 (see FIG. 1) to a position where the magnet 46*a* is aligned with the shaft 40, thereby raising the seismic sensor. As a result the magnet 46*b* is somewhat separated from the shaft 40, thus releasing the flapper arm 48 and attached flapper-valve 50, thus closing the valve and switch 10 and actuating the switch 62. The structure and use of the set lever 14 is described in FIG. 5 U.S. Pat. No. 6,112,764 for Automatic Safety Shutoff Valve," incorporated by reference above.

In some uses, it is desirable that the micro switch 62 does not reside inside the valve housing. A fourth cross-sectional view of the valve and switch 10 taken along line 2—2 of FIG. 1B is shown in FIG. 2D. A second valve housing 18*a* with a first switch arm 72 is shown in mechanical cooperation with the pin 52 (see FIG. 2A) whereby closing the flapper-valve is coupled into a motion of the switch arm 72.

Figure 3B:
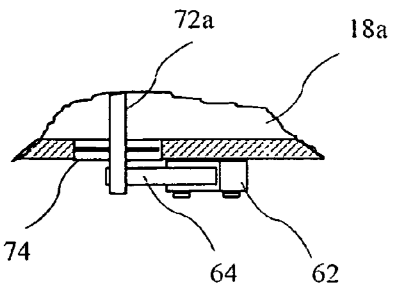
FIG. 3B is a cross-sectional top view taken along line 3B—3B of FIG. 3A of a portion of the second valve housing and the externally mounted electrical switch.
Figure 3C:
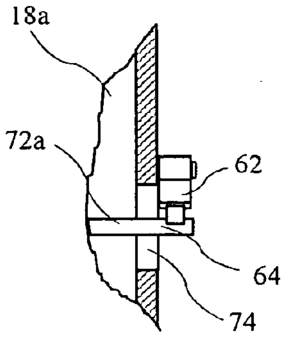
FIG. 3C is a cross-sectional end view taken along line 3C—3C of FIG. 3A of a portion of the second valve housing and the externally mounted electrical switch.
Figure 3A:
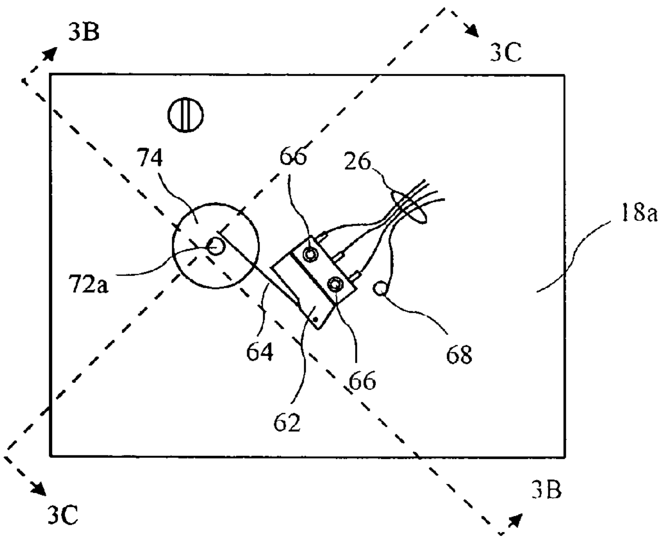
FIG. 3A is a side view of a second valve housing and an externally mounted electrical switch.

A side view of the valve housing 18*a* is shown in FIG. 3A. The switch 62 is attached to the outside of the housing 18*a*, which switch 62 is inverted and at approximately a 45 degree angle, thereby aligning the switch actuator 64 approximately perpendicular to the motion imparted from the seal 50 to the switch arm 72*a*. The switch arm 72*a* extends though a diaphragm 74 in the side of the housing 18*a*, which diaphragm 74 flexibly supports the switch arm 72*a*. The diaphragm is preferably a flexible metal diaphragm or an elastomer diaphragm. The externally mounted switch is preferably a micro switch, and more preferably a 311 SM702-T switch manufactured by Honeywell in Morristown, N.J.

Figure 3D:
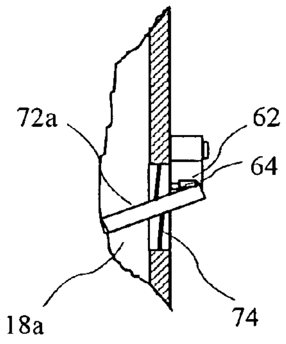
FIG. 3D is a cross-sectional end view taken along line 3C—3C of FIG. 3A of a portion of the second valve housing and the externally mounted electrical switch with the switch actuated.

A cross-sectional top view of a portion of the valve housing 18*a* taken along line 3B—3B of FIG. 3A is shown in FIG. 3B, and a cross-sectional end view taken along line 3C—3C of FIG. 3A in FIG. 3C. The switch arm 72*a* is shown extending through the diaphragm 74 to cooperate with the switch actuator 64. A second cross-sectional end view taken along line 3C—3C is shown in FIG. 3D wherein an interior end of the switch arm 72*a* has been depressed by the pin 52 as depicted in FIG. 2D. The switch arm 72*a* pivots about an axis approximately in the plane of the diaphragm 74 and an exterior end of the switch arm 72*a* pushes the switch actuator 64 upward to activate the switch 62.

Figure 4A:
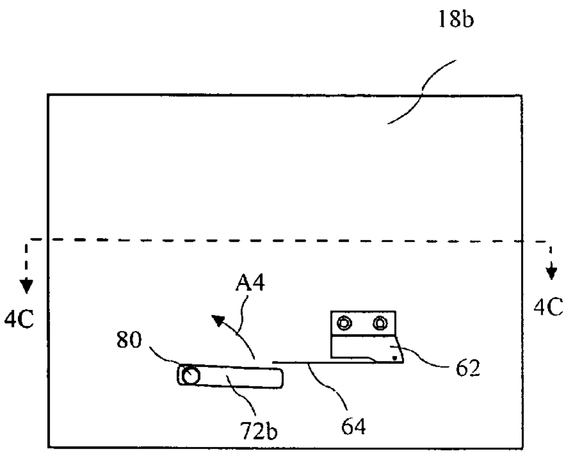
FIG. 4A is a side view of a third valve housing and a second externally mounted electrical switch.
Figure 4B:
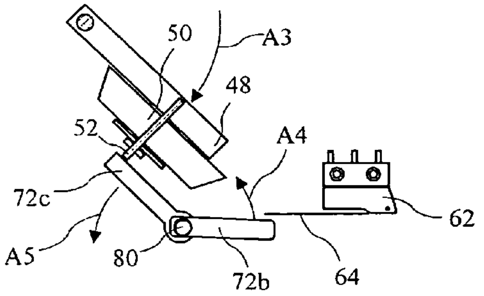
FIG. 4B is a side view showing elements for actuating the second externally mounted electrical switch.
Figure 4C:
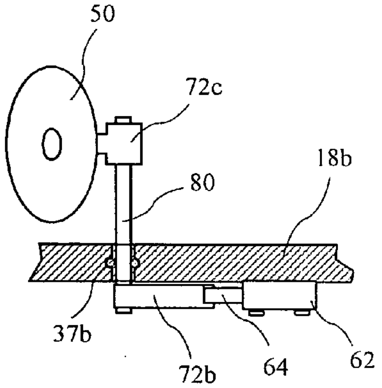
FIG. 4C is top view of a portion of the third valve housing and the second externally mounted electrical switch and actuating elements.

A side view of a third valve housing 18*b* is shown in FIG. 4A. A second switch arm 72*b* is attached to a switch shaft 80 extending though a side of the valve housing 18*b*. The switch 62 is mounted on the side of the valve housing 18*b*. The switch arm 72*b* rotates along arc A4 when the flapper-valve 50 is closed, and thereby pushes the switch actuator 64 up, and activates the switch 62. A view of the elements providing actuation of the switch 62 are shown in FIG. 4B. The when the seal 50 closes along arc A3, the pin 52 pushed against a third switch arm 72*c*. The arm 72*c* pivots about the shaft 80 as indicated by arc A5. The shaft 80 couples the rotation to the arm 72*b*, causing the arm 72*b* to pivot along arc A4, thereby lifting the switch actuator 64 and actuating the switch 62. A top view of a portion of the valve housing 18*b* and the switch actuating elements are shown in FIG. 4C. Second o-ring 37*b* forms a seal between the valve housing 18*b* and the shaft 80.

Figure 5:
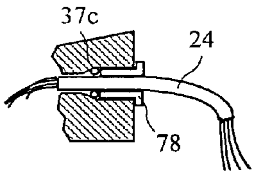
FIG. 5 shows a switch cable held to the valve housing using an o-ring and o-ring retainer.

A second method of sealing and/or securing the cable 24 to the valve housing 18 is shown in FIG. 5. A third o-ring 37*c* forms a seal between the cable 24 and the valve housing 18, which o-ring 37*c* is retained by an o-ring retainer 78.

Figure 6:
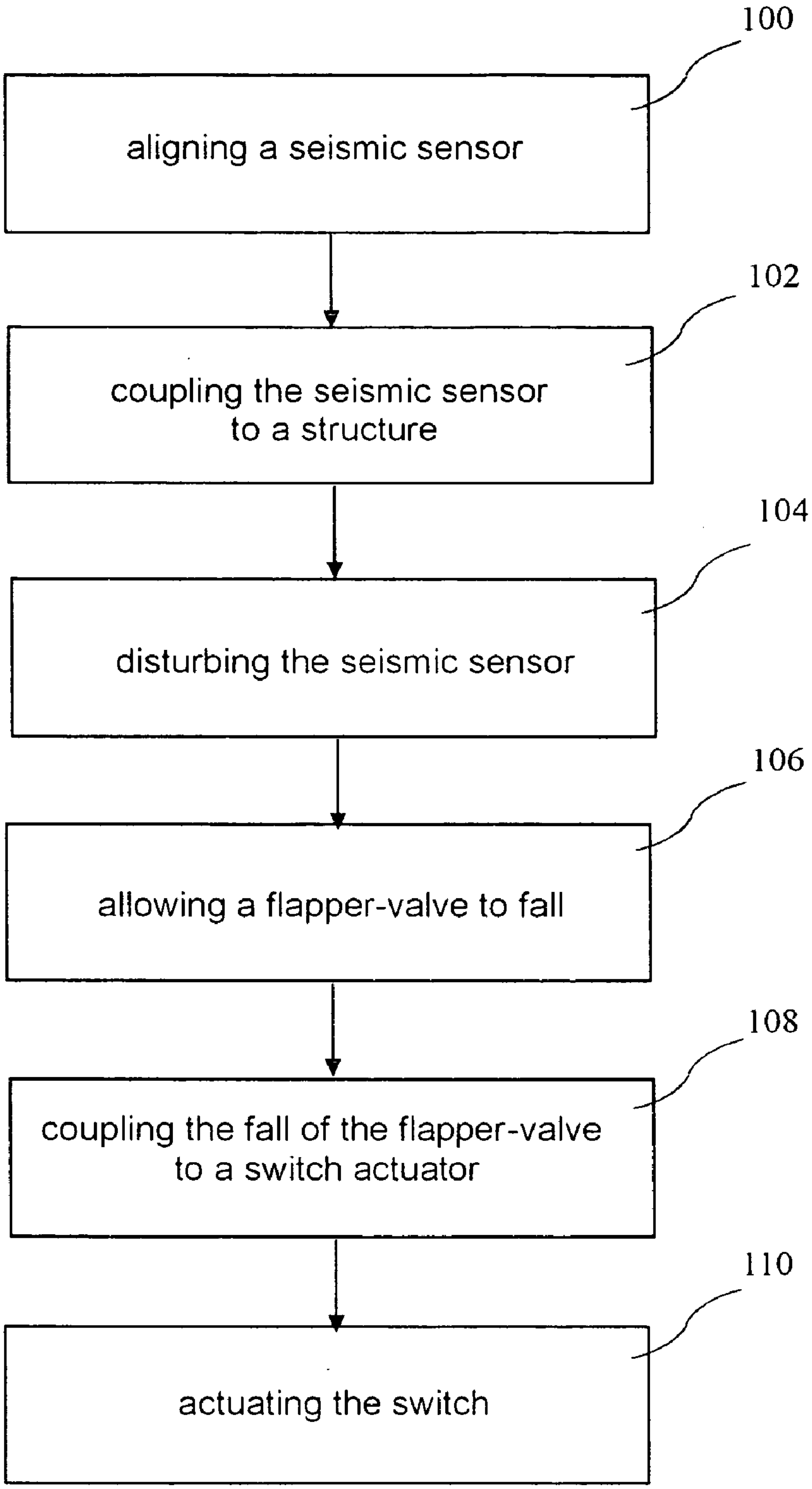
FIG. 6 is a method for blocking a flow of gas and actuating a switch.

A method for closing a gas valve and actuating a switch in the event of an earthquake is described in FIG. 6. The method includes aligning a seismic sensor to hold a flapper-valve in an open position at step 100 and coupling a housing containing the seismic sensor to a structure that experiences accelerations during an earthquake at step 102. An earthquake occurrence disturbs the seismic sensor at step 104, allowing the flapper-valve to fall against a seat to block a flow of gas at step 106, The fall of the flapper-valve is coupled to a switch actuator of an electrical switch at step 108, actuating the switch at step 110. The method may further include turning a set lever to close the flapper-valve and actuate the switch, and/or turning a reset mechanism to open the flapper-valve and de-actuate the switch.

While the invention herein disclosed has been described by means of specific embodiments and applications thereof, numerous modifications and variations could be made thereto by those skilled in the art without departing from the scope of the invention set forth in the claims.

I claim:

1. A motion actuated device comprising:
- a valve housing having an inlet and an outlet;
- a seismic sensor having a rest position and a disturbed position;
- a pivoting flapper-valve having an open position and a closed position, wherein the valve is adapted to be held in the open position when the seismic sensor is in the rest position, and the valve is adapted to fall into the closed position blocking a flow through the valve housing when the seismic sensor moves from the rest position to the disturbed position; and
- an electrical switch residing in the valve housing and mechanically connected to the valve, wherein the electrical switch is actuated if the valve moves between the open position and the closed position.

2. The motion actuated device of claim 1, wherein the flapper-valve is attached to a pivoting flapper arm.

3. The motion actuated device of claim 1, wherein:
- the inlet is aligned to receive a substantially horizontally running line; and
- the outlet is aligned to receive a substantially horizontally running line.

4. The motion actuated device of claim 3, wherein the outlet is horizontally displaced from the inlet.

5. The motion actuated device of claim 1, wherein the flapper-valve is adapted to control a flow of gas.

6. The motion actuated device of claim 1, wherein the flapper-valve is magnetically held in the open position.

7. The motion actuated electrical switch of claim 1, wherein the electric switch is a micro switch.

8. The motion actuated electrical switch of claim 7, wherein the micro switch is a Single-Pole Double-Throw (SPDT) micro switch.

9. The motion actuated electrical switch of claim 1, further including a four conductor cable electrically connected to the electrical switch, wherein the conductor cable comprises:
- a normally open conductor;
- a normally closed conductor;
- a neutral conductor; and
- a ground conductor.

10. The motion actuated electrical switch of claim 1, wherein the electric switch includes a switch actuator, and wherein the flapper-valve is adapted to actuate the switch when the flapper-valve is in the closed position.

11. The motion actuated electrical switch of claim 1, wherein the flapper-valve includes a pin, and wherein the pin mechanically contacts the switch actuator when the flapper-valve is in the closed position, which contact actuates the switch.

12. An earthquake actuated valve and switch comprising:
- a valve housing having a gas inlet and a gas outlet;
- a seismic sensor having a rest position and a disturbed position;
- a pivoting flapper-valve having an open position and a closed position, wherein the flapper-valve is adapted to be held in the open position when the seismic sensor is in the rest position, and the flapper-valve is adapted to fall into the closed position blocking a flow through the valve housing when the seismic sensor moves from the rest position to the disturbed position; and an electrical switch residing in the valve housing and mechanically actuated by the flapper-valve, wherein the electrical switch is actuated if the flapper-valve moves between the open position and the closed position.

13. A method for closing a gas valve and actuating a switch in the event of an earthquake, the method comprising:

aligning a seismic sensor to magnetically hold a pivoting flapper-valve residing inside a valve housing in an open position;

coupling the seismic sensor to a structure that experiences accelerations during an earthquake;

disturbing the seismic sensor when an earthquake occurs;

allowing the flapper-valve to fall against a seat to block a flow of gas through the valve housing when the seismic switch is disturbed;

coupling the fall of the flapper-valve to a switch actuator of an electrical switch residing inside the valve housing; and actuating the switch.

14. The method of claim 13, further including turning a set lever to close the flapper-valve and actuate the switch.

15. The method of claim 13, further including turning a reset mechanism to open the flapper-valve and de-actuate the switch.

* * * * *